United States Patent [19]

Katsuzawa et al.

[11] Patent Number: 5,166,565
[45] Date of Patent: Nov. 24, 1992

[54] HOLD STRUCTURE FOR BEARING IN ELECTRICAL MOTOR

[75] Inventors: Yukio Katsuzawa; Michi Masuya; Yasuyuki Nakazawa, all of Yamanashi, Japan

[73] Assignee: Fanuc Ltd., Yamanashi, Japan

[21] Appl. No.: 490,631
[22] PCT Filed: Oct. 4, 1989
[86] PCT No.: PCT/JP89/01010
   § 371 Date: May 21, 1990
   § 102(e) Date: May 21, 1990
[87] PCT Pub. No.: WO90/04113
   PCT Pub. Date: Apr. 19, 1990

[30] Foreign Application Priority Data

Oct. 7, 1988 [JP] Japan ................ 63-251997

[51] Int. Cl.⁵ ............... H02K 5/16; F16C 35/077
[52] U.S. Cl. ........................ 310/90; 310/42; 384/537
[58] Field of Search ............ 310/42, 90; 384/493, 384/537, 585

[56] References Cited

U.S. PATENT DOCUMENTS

| | | |
|---|---|---|
| 3,757,147 | 9/1973 | Lyman, Jr. ............... 310/90 |
| 4,048,530 | 9/1977 | Kaufman, Jr. ............ 310/90 |
| 4,944,611 | 7/1990 | Ankenbauer et al. ...... 384/537 |
| 4,980,587 | 12/1990 | Yonei et al. ............. 384/585 |

FOREIGN PATENT DOCUMENTS

| | | | |
|---|---|---|---|
| 111547 | 9/1975 | Japan. | |
| 215945 | 12/1983 | Japan | 310/90 |
| 61-79069 | 9/1986 | Japan. | |

Primary Examiner—Steven L. Stephan
Assistant Examiner—D. L. Rebsch
Attorney, Agent, or Firm—Armstrong, Nikaido, Marmelstein, Kubovcik & Murray

[57] ABSTRACT

An inner portion of a hold structure for a bearing (26) in an electrical motor, in which the output shaft receives a radial load and a thrust load, is constructed by a layer (24) of a ductile material containing iron as a main component. An inner surface of the layer (24) is machined to enhance the concentricity of the inner surface after aluminum front and rear housings (10, 14) are assembled to a stator (16). An end face (46) of the layer (24) is in tight contact with an end-hold portion (44) integrated with the front housing (10) to form a hold structure for a bearing in such a manner that a burr is not generated at an edge (B) of the end face of the layer (24) when machined.

6 Claims, 3 Drawing Sheets

5,166,565

HOLD STRUCTURE FOR BEARING IN ELECTRICAL MOTOR

TECHNICAL FIELD

The present invention relates to a hold structure for a bearing in a general-purpose electrical motor having a small size and a large output power, and able to rotate at a high speed.

BACKGROUND ART

In general, an output shaft of an electrical motor is journaled by bearings housed in a housing of the motor at the front and the rear thereof, and when the motor is applied as a drive source to an industrial machine such as a machine tool, a radial load and a thrust load are imposed on the output shaft thereof. Usually, the housing is formed by aluminum castings, and the front and the rear inner surfaces of this housing are often damaged, due to a direct pressure exerted thereon by the bearings. Therefore, a layer containing iron as a main component thereof, which is hard and thus is not easily damaged, is provided at the inner portion of the housing receiving such a pressure, to enable a hold structure for a bearing to withstand a radial load.

Nevertheless, an outside end face of either bearing is held by a member such as a C-shape ring when the bearings are incorporated in the housing, to retain the bearing so that it cannot move in the longitudinal direction of the motor. For this purpose, a groove is provided in the layer so that the member is retained in the inner portion of the housing, i.e., in the layer. The groove receives a thrust load acting on the output shaft through the bearings and the member, and therefore, is made of a ductile material containing iron as a main component thereof, such as FCD (Nodular Graphite Cast Iron) according to the JIS (Japanese Industrial Standard), to prevent damage.

On the other hand, after a central housing integrated with a stator is combined with a front or rear housing provided with the above-mentioned layer containing iron as a main component thereof at the inner portion thereof, an inner surface of the layer of a ductile material, which holds an outer ring of the bearing, is finish-machined to enhance the retain accuracy of the bearing, and a burr is often generated at the end point of the layer when machined, because the layer to be machined is made of a ductile material. When the burr is removed, a problem arises in that it sometimes drops into a stator coil winding, or that it prevents the incorporation of the bearings and a rotor.

DISCLOSURE OF THE INVENTION

Therefore, an object of the present invention is to solve these problems by providing a hold structure for a bearing which prevents the generation of a burr when the portion for holding a bearing is machined.

In view of the above object, the present invention provides a hold structure for a bearing in an electrical motor having a front bearing and a rear bearing journaled on an output shaft, characterized in that an inner portion of a housing for holding an outer ring of one of the front and rear bearings is covered with a layer of a material containing iron as a main component thereof, a longitudinal inside end face of the layer is in tight contact with an end-hold member integrated with the housing, and each inner surface of the layer and the end-hold member is formed with the same diameter.

The housing of an electrical motor is, in general, made of a free-cutting material such as an aluminum casting, and therefore, by adopting a structure wherein the longitudinal inside end face of the layer is in tight contact with the end-hold member constructed as a part of the housing, a burr is not generated at a point of the end face of the layer when the end-hold member as well as the layer is machined.

BEST MODE OF CARRYING OUT THE INVENTION

Figure 1:
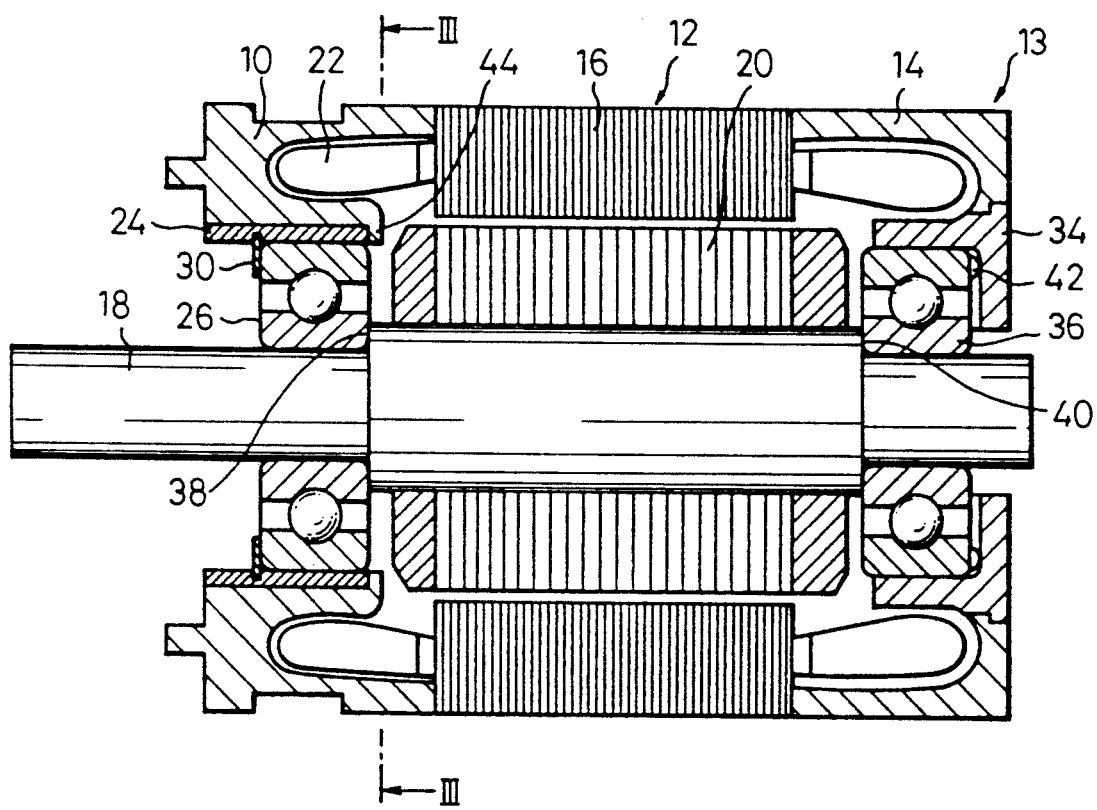
FIG. 1 is a longitudinal sectional view of an electrical motor having a hold structure for a bearing according to the present invention.
Figure 2:
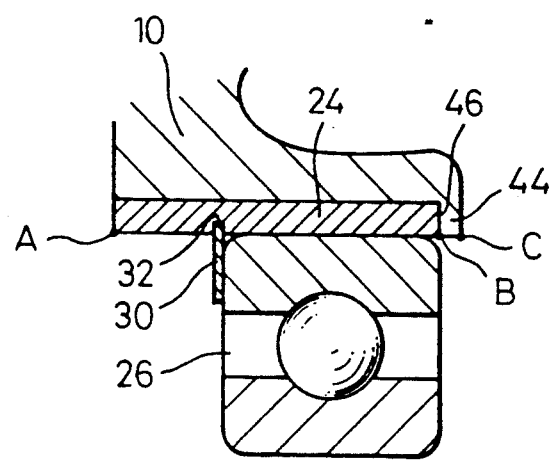
FIG. 2 is an enlarged sectional view of a bearing and the holding portion in FIG. 1.

The present invention will be now explained in detail, based on the embodiments shown in the attached drawings. Referring to FIGS. 1 and 2, a front housing 10 and a rear outer housing 14 constituting an outer periphery of a rear housing 13 are fixed to a central housing 12 consisting of a core portion of a stator 16, at the front or the rear thereof, and a rear inner housing 34 is attached to the inner side of the rear outer housing 14. A thin cylindrical and ductile nodular graphite cast iron member 24 of FCD according to the JIS is integrated with the front housing 10 at the inner surface thereof. The casting member 24 is inserted as an insert member when the front housing 10 is formed by aluminum die casting, to be integrated therewith. An output shaft 18 is journaled by bearings 26 and 36 held by the front and the rear housings 10 and 13 in the casing constructed as mentioned above, and a rotor 20 is fixed on the output shaft 18 at a position corresponding to a core portion of the stator 16, to rotate with the output shaft 18.

Figure 4:
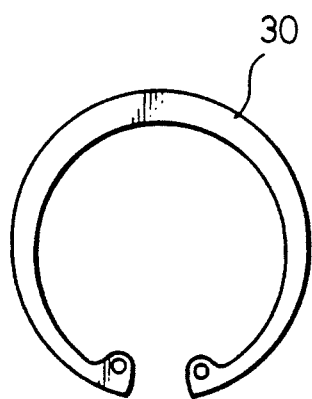
FIG. 4 is a plan view of a C-shaped ring.

A groove 32 is formed at an appropriate position in the casting member 24 fixed to an inner surface of the front housing 10, and a C-shaped ring 30 shown in FIG. 4, having elasticity in a circular direction thereof, is engaged in the groove 32 to retain the front bearing 26 and prevent its movement in the longitudinal direction of the motor. The front bearing 26 is positioned in the longitudinal direction by the C-shaped ring 30 and a shoulder 38 of the output shaft 18, and the rear bearing 36 is held between the other shoulder 40 of the output shaft 18 and a belleville spring 42 provided in the rear inner housing 34. The rear inner housing 34 is made of the same nodular graphite cast iron as the thin cylindrical member 24.

Figure 3:
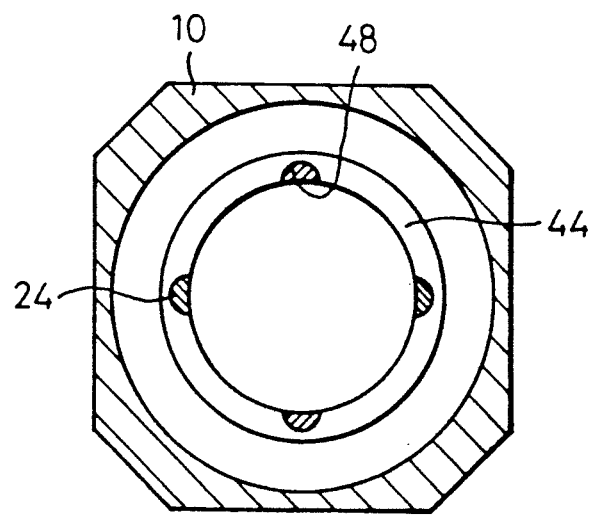
FIG. 3 is a partially enlarged cross-sectional view of a front housing before finish-machining, taken along a line III—III of FIG. 1.

Referring also to FIG. 3, an assembly of the motor and a finish-machining process will be explained. First, the rear outer housing 14 is fixed to the rear of the central housing 12 consisting of the core of the stator 16 provided with a stator coil 22, and the front housing 10 integrated with the cylindrical member 24 at the inner surface thereof is fixed to the front. FIG. 3 shows a cross sectional view of the housing at this stage, i.e., a view taken along a line III—III in FIG. 1 as a longitudinal sectional view of the motor after the assembly is finished, but with the bearing 26 and so on omitted. The longitudinal inside end face 46 of the cylindrical casting member 24 is in tight contact with an end-hold portion 44 integrated with the front housing 10 of an aluminum casting. The cylindrical casting member 24 is inserted as an insertion member when the aluminum is cast by a die to form the front housing 10, whereby the member is integrated with the front housing 10. During this operation, the cylindrical member 24 must be held by an appropriate jig to maintain the inserted position thereof. Therefore, recessed portions 48 are formed at several positions (four positions in the embodiment) in the end-hold portion 44 as shown in FIG. 3, and the cylindrical member 24 is held by the appropriate jig through the recessed portions 48. Accordingly, the recessed portions 48 may be small, i.e., semi-circular recesses having a radius of about 1 mm in the embodiment. In FIG. 3, they are shown on an enlarged scale.

After the front, central, and rear outer housings are combined, the inner portion of the front housing, i.e., the cylindrical casting member 24, is machined with the end-hold portion 44 from a point A to a point C through a point B. The depth of the cut is to the same dimension as the recessed portion 48 shown in FIG. 3; namely, about 1 mm. After the cutting, finish-machining is carried out to journal the front bearing 26 accurately onto the output shaft 18. When machined, no burr is generated at the end point B of the inner portion of the housing, even though the cylindrical casting member 24 is made of a ductile material, because the inside end face 46 of the member 24 is in tight contact with the end-hold portion 44. Furthermore, the finish-machining is effected also from the points A to C through the point B, and no burr is generated on the end-hold portion 44, because it is made of an aluminum casting and can be freely machined.

The groove 32 for the C-shaped ring 30 is formed by a machining carried out after the above-mentioned machining. After the C-shaped ring 30 is engaged in the groove, the output shaft 18 with a rotor fixed thereon, and with the front bearing 26 provided thereon, is inserted from the rear of the rear outer housing 14, the rear bearing 36 is mounted on a rear portion of the output shaft 18 from the rear, and finally, the rear inner housing 34 is combined by fixing the belleville spring 42 therebetween.

If a burr is generated when the inner surface of the front housing 10 is finish-machined, a process for removing the burr must be adopted in which the burr is blown off by a compressed air. The blown burr, however, may fall into the stator coil 22, to cause a breakdown of the insulation, because the front housing 10 has already been integrated with the stator 16. On the other hand, if the burr is not removed, insertion of the bearing becomes difficult and has other adverse effects. In a hold structure for the front bearing according to the present invention a burr is not generated by the finish-machining, and although the rear inner housing 34 holds the rear bearing 36, problems such as abovementioned do not arise because the housing 34 itself is finish-machined before being combined.

Furthermore, another construction such that the output shaft is inserted from the front by exchanging the front and the rear of the housing of the abovementioned example, may be adopted.

It will be apparent from the foregoing description that, according to the present invention, although an inner portion of a housing to hold an outer ring of a bearing is made of a ductile material layer containing iron as a main component thereof, a burr is not generated at an edge of the longitudinal end face of the layer when the ductile material layer containing iron as a main component thereof as a hold portion for the bearing is finish-machined after the housings are assembled, because the inside end face of the layer is in tight contact with an end-hold portion integrated with the housing made of a freely cuttable material, and therefore, the stator coil is not damaged and no obstacle arises when the bearing is combined. Accordingly, there can be provided an electrical motor with a high reliability, and a smooth and efficient assembly thereof is attained.

We claim:

1. A hold structure for a bearing in an electrical motor having a front bearing and a rear bearing journaled on an output shaft, characterized in that an inner portion of a housing for holding an outer ring of one of said front and rear bearings is covered with a layer of a material containing iron as a main component thereof, a longitudinal inside end face of said layer is in tight contact with an end-hold member integrated with said housing, and each inner surface of said layer and said end-hold member is formed with the same diameter.

2. A hold structure for a bearing in an electrical motor according to claim 1, wherein said layer of a material containing iron as a main component is provided on an inner portion of the front housing facing said outer ring of the front bearing, and said end-hold member is integrated with said front housing by die casting.

3. A hold structure for a bearing in an electrical motor according to claim 1, wherein a groove is formed on an inner surface of said layer, in which groove a C-shaped ring for receiving the bearing in a thrust direction is engaged.

4. A hold structure for a bearing in an electrical motor according to claim 2, wherein a groove is formed on an inner surface of said layer, in which groove a C-shaped ring for receiving the bearing in a thrust direction is engaged.

5. A hold structure for a bearing in an electrical motor according to claim 3, wherein said layer is made of nodular graphite cast iron.

6. A hold structure for a bearing in an electrical motor according to claim 4, wherein said layer is made of nodular graphite cast iron.

* * * * *